United States Patent [19]
Brackett

[11] 3,902,699
[45] Sept. 2, 1975

[54] PROPELLER JACKS

[76] Inventor: Robert R. Brackett, 8825 38th St., Kenosha, Wis. 53140

[22] Filed: Nov. 28, 1973

[21] Appl. No.: 419,783

[52] U.S. Cl. .............................. 254/93 R; 254/134
[51] Int. Cl. .............................................. B66f 3/36
[58] Field of Search .......... 254/93 R, 133, 134, 2 B, 254/1, 100; 214/1 SW

[56] References Cited
UNITED STATES PATENTS

| | | | |
|---|---|---|---|
| 1,268,410 | 6/1918 | Weber | 254/DIG. 1 |
| 1,708,761 | 4/1929 | Horbath | 214/1 SW |
| 2,189,010 | 2/1940 | Lewis | 254/2 B |
| 2,240,724 | 5/1941 | Stoehr | 254/1 |
| 2,416,848 | 3/1947 | Rothery | 254/1 |
| 2,487,792 | 11/1949 | Custer | 254/134 |
| 2,707,615 | 5/1955 | Green | 254/133 R |
| 2,814,099 | 11/1957 | Knittel | 254/100 |

*Primary Examiner*—Al Lawrence Smith
*Assistant Examiner*—Robert C. Watson
*Attorney, Agent, or Firm*—Robert J. Steininger

[57] ABSTRACT

Rests for receiving portions of the propeller of an aircraft capable of supporting the weight of the aircraft without damage to said propeller are connected to the extensible portion of a jack having its base resting on legs equipped with suitable adjustments to position said rests securely beneath the propeller before lifting begins. The legs are pivoted on bases allowing said rests to follow the fore and aft movement of the aircraft as said aircraft is raised vertically by the jack.

1 Claim, 5 Drawing Figures

PATENTED SEP 2 1975   3,902,699

PROPELLER JACKS

BACKGROUND OF THE INVENTION

1. Field of the Invention

This invention pertains to the art of jacks which are suitable for exerting an upward force on the aircraft propeller to lift the front of the aircraft off its support wheel or wheels.

2. Description of the Prior Art

Aircraft construction is such that points of access to the rigid structural frame are limited. It is therefore common practice to make provision for lifting the aircraft and its several components by using pads or adapters manufactured integrally with the internal frame. These pads and adapters are the source of considerable difficulty adding weight and increasing wind resistance and generally breaking the lines of the outer shell of the aircraft. Accordingly, a device which lifts the aircraft off the front wheel assembly and holds it securely with the assembly suspended, without using special components added to the aircraft specifically for that purpose, constitutes a matter of substantial improvement in the design and construction of aircraft lifting devices.

SUMMARY OF INVENTION

It is in the nature of aircraft construction to build the propeller and the shaft on which it rotates in such a relationship with the aircraft frame as to cause the entire weight of the aircraft to move through the atmosphere suspended on such propeller. Accordingly, points at which the propeller shaft is mounted on such frame are constructed to transmit the mass of the aircraft to the propeller with the necessary factor of safety. Applicant has taken advantage of these essentials of aircraft construction in designing a propeller craft lifting device which can lift the standard form of aircraft without special pads or adapters.

In the attached drawings and the following description two of the best modes presently contemplated for carrying out the invention are set forth. Details for making and using the invention as thus described are set forth in such full, clear, concise and exact terms as to enable a person skilled in the art to which it pertains, or to which it is most clearly connected, to make and use the invention. It should be emphasized, however, that the subject matter regarded as the invention is not limited to the herein described embodiments of it, but rather includes everything falling within the claims set forth in the conclusion of this specification.

Figure 1:
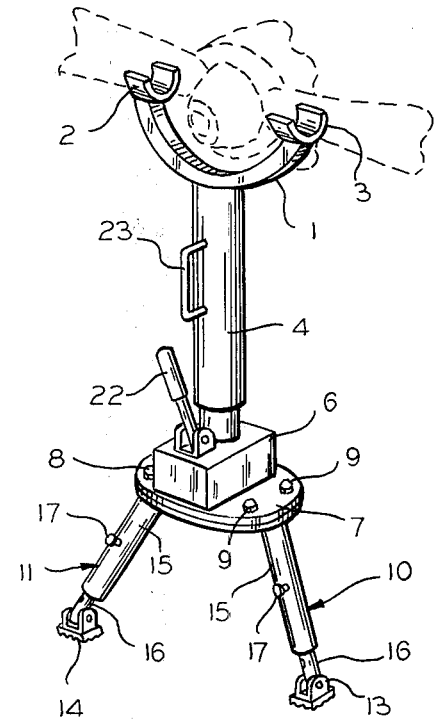
FIG. 1 is a perspective view of the invention showing the relationship between the jack and the propeller of the aircraft to be lifted.
Figure 2:
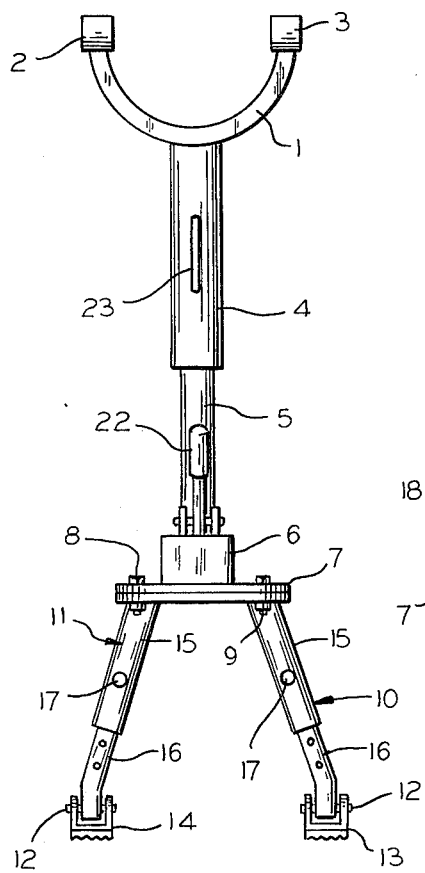
FIG. 2 is a front view of the invention showing the jack in extended position.
Figure 3:
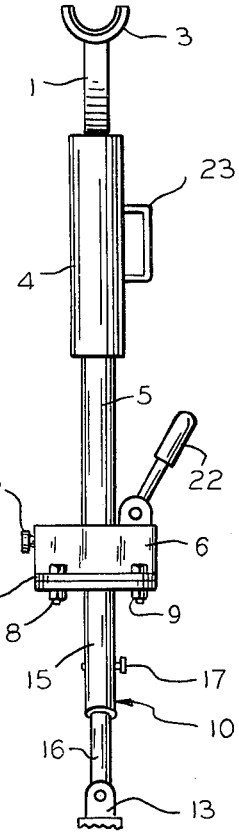
FIG. 3 is a side view of the invention shown in FIG. 2.
Figure 4:
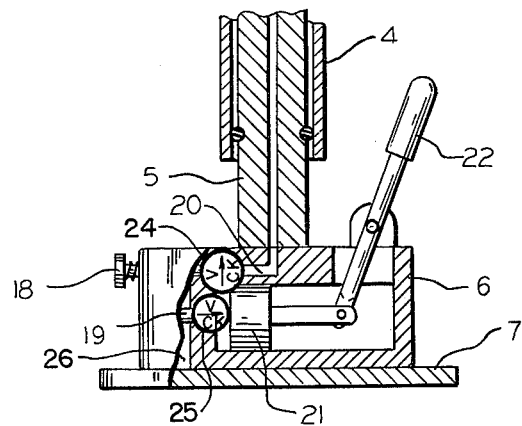
FIG. 4 is a partial view of the invention showing the lifting device of the first embodiment partially in cross section.

Referring now to the drawings in detail, FIG. 1 shows yoke 1 supporting the front of the aircraft to be lifted by bearing plates 2 and 3 fitted beneath the rounded portion of the propeller blades near the point of attachment to the propeller hub. Yoke 1 is fixed to the upper end of cylinder 4 which cylinder telescopes on hollow shaft 5. Hollow shaft 5 is integral with 6 and base 6 is secured to base frame 7 by bolts 8 and 9. Frame 7 is fixed to telescoping legs 10 and 11 which are pivoted at 12 to non-skid shoes 13 and 14, respectively. Legs 10 and 11 consist of a tube 15 and a shaft 16 and a series of holes in said shaft 16 suitable for alignment with a single hole in tube 15 and for insertion of pin 17 to fix legs 10 and 11 at the desired length.

Cylinder 4, hollow shaft 5 and sump 26 in base 6 form a fluid containing system in the first embodiment of the invention. With valve control 18 closed, as piston 21 is moved away from line 19 a first check valve 24 in any conventional form in line 20 closes to prevent fluid from passing from line 20 into line 19 and a second check valve 25 in any conventional form in line 19 opens to allow fluid to pass from sump 26 into the space between said valve 24 and valve 25; and as piston 21 is moved toward said line 19 said second valve 25 prevents fluid in said space from passing into said sump 26 while said first valve 24 opens to allow fluid in said space to pass into line 20. When valve control 18 is open fluid flows from line 20 into sump 26.

When it is necessary to lift an aircraft valve control 18 is closed and bearing plates 2 and 3 are placed in contact with the propeller of the aircraft to be raised. Pin 17 is removed from legs 10 and 11 allowing shafts 16 to drop until shoes 13 and 14 rest on the surface supporting the aircraft. Pin 17 is then inserted in legs 10 and 11 and handle 22 is moved toward and away from hollow shaft 5 causing piston 21 to alternately force fluid through line 20 and withdraw fluid through line 19. As fluid moves through line 20 the volume of fluid in cylinder 4 is increased raising said cylinder in hollow shaft 5 which in turn raises the propeller resting on bearing plates 2 and 3. When it is desired to lower the aircraft, valve control 18 is opened allowing fluid to pass from line 20 into sump 26 thus lowering cylinder 4 so that the jack can be easily removed and carred away by handle 23.

Figure 5:
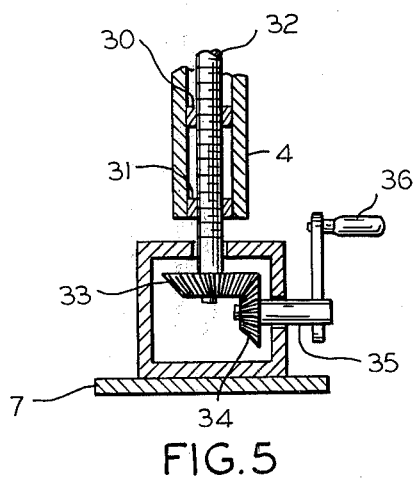
FIG. 5 is a partial view of the invention showing the lifting device of the second embodiment in full cross section.

A second embodiment of the invention is shown in FIG. 5 in which cylinder 4 is constructed with internally mounted threaded members 30 and 31 receiving threaded shaft 32. Shaft 32 terminates at one end in first bevel gear 33. First bevel gear 33 meshes with second bevel gear 34 on shaft 35. Handle 36 is fixed to shaft 35. In this embodiment of the invention upward motion of cylinder 4 and of an aircraft supported on bearing plates 2 and 3 is achieved by turning shaft 35 with handle 36. Lowering of said cylinder 4 and of the aircraft is achieved by rotating said shaft 35 in the opposite direction.

I claim:

1. In a lifting device for raising a propeller powered craft, the combination of:

only two spaced support shoes, a frame comprising a base plate supported by only two telescoping cylinders having corresponding holes for receiving pins fixing the combined length of said cylinders, one said cylinder pivotally connected to each such support shoe, a cylinder mounted above said base plate and supported thereby, such cylinder having a second cylinder which is closed at one end, slidably mounted thereon to form an expandable fluid container and supporting a yoke with spaced arcuate bearing plates on yoke ends projecting away from said base plate, a fluid reservoir mounted on said base plate having a fluid connection with said expandable fluid container, check valves in said fluid connection which allow fluid to flow from said reservoir and prohibit fluid flow from said expandable fluid container when pressure is reduced on said fluid connection and prohibit fluid from flowing into said reservoir but allow fluid to flow to said expandable fluid container when pressure is increased on said fluid connection, and a cylinder opening into said fluid connection with a piston mounted therein to draw fluid from said reservoir when said cylinder is partially evacuated by withdrawing the piston from said cylinder adjacent the reservoir and to force fluid into said expandable fluid container when pressure is increased by moving said piston into said cylinder adjacent said reservoir.

* * * * *